A. J. R. FIEGO.
ELECTRIC METER.
APPLICATION FILED MAR. 20, 1914.
1,226,491. Patented May 15, 1917.
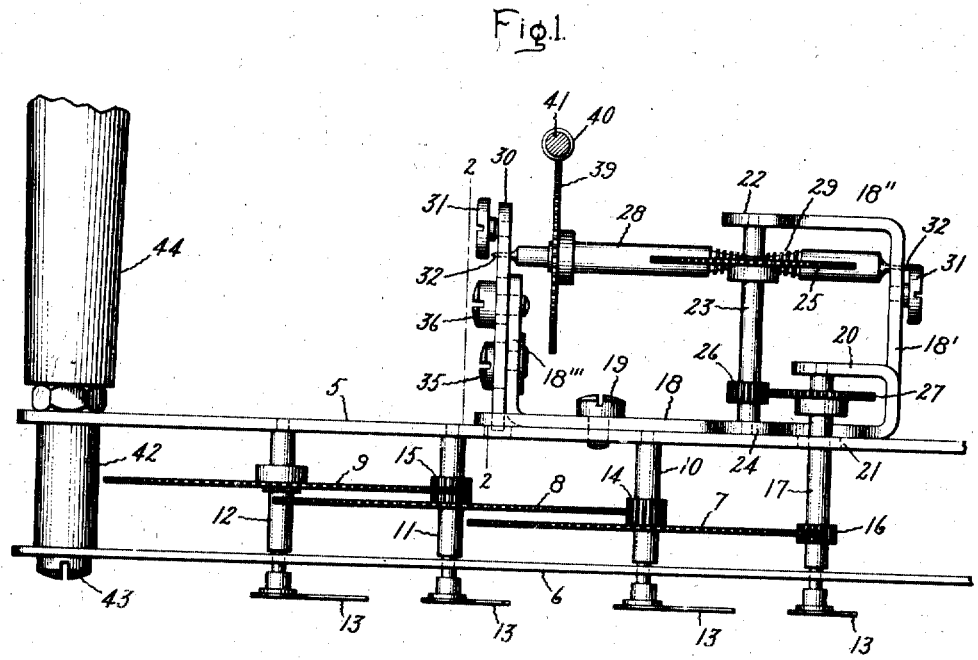
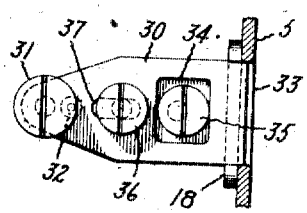
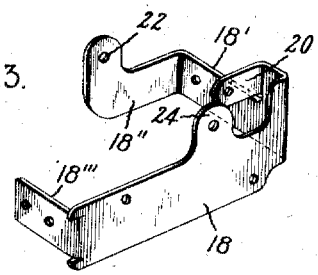
Witnesses:
Chas B Stokes
J. Elli Elen.
Inventor:
Alexander J. R. Fiego,
by [signature]
His Attorney.

UNITED STATES PATENT OFFICE.

ALEXANDER J. R. FIEGO, OF LYNN, MASSACHUSETTS, ASSIGNOR TO GENERAL ELECTRIC COMPANY, A CORPORATION OF NEW YORK.

ELECTRIC METER.

1,226,491.     Specification of Letters Patent.     Patented May 15, 1917.

Application filed March 20, 1914. Serial No. 825,998.

*To all whom it may concern:*

Be it known that I, ALEXANDER J. R. FIEGO, a citizen of the United States, residing at Lynn, county of Essex, State of Massachusetts, have invented certain new and useful Improvements in Electric Meters, of which the following is a specification.

My invention relates particularly to electric motor meters and in general to electric motors of the electric meter type. My invention more particularly relates to the ratio or reduction gearing between the register and the rotatable shaft of an electric motor meter, and more generally the gearing between the rotatable shaft of an electric motor of the electric meter type and the member to be driven thereby.

The object of my invention is to generally improve and simplify the mounting for the ratio or reduction gearing of electric meters and such other apparatus as my invention relates to, and to provide a mounting and reduction gearing connection of novel and simple construction.

The features of my invention which I consider patentably novel are definitely indicated in the claims appended hereto. The construction of a combined meter register and coöperating reduction gearing adapted for direct connection to the meter shaft and embodying the novel features of my invention will be understood from the following description taken in connection with the accompanying drawings in which Figure 1 is a top plan view of the meter register and the reduction gearing operatively connecting the register to the rotatable shaft of an electric meter; Fig. 2 is a sectional view taken along the line 2—2 of Fig. 1; and Fig. 3 is a perspective view of the supporting bracket for the reduction gearing.

The meter register comprises two parallel plates 5 and 6 between which the integrating gear train of the register is suitably mounted. This register gear train comprises three gear wheels 7, 8 and 9 secured to shafts 10, 11 and 12 respectively. The shafts are journaled in suitable bearings or pivot holes in the plates 5 and 6, and each shaft carries a dial pointer 13. Pinions 14 and 15 are secured to the shafts 10 and 11 respectively and mesh with and drive the gear wheels 8 and 9 respectively. The first gear 16 of the integrating gear train meshes with and drives the gear wheel 7 and is carried by a shaft 17. A dial pointer 13 is also secured to the shaft 17. The gear ratio of the gears 16, 14 and 15 and the gears 7, 8 and 9 is 1 to 10, as well understood in the art.

A bracket 18 is rigidly secured to the plate 5 by means of screws 19. This bracket in conjunction with the plates of the register is adapted to form the sole mounting for the ratio or reduction gearing operatively connecting the meter register to the rotatable shaft of the meter. The novel and peculiar configuration of this bracket is best illustrated in Fig. 3 of the drawings.

The bracket is bent so that its outline forms an incomplete rectangle, the incomplete portions of the rectangle being a corner and a part of the two adjacent sides. The right-hand side 18′ of the bracket, as viewed in Fig. 1 of the drawings, has an inwardly extending lug 20. This lug is positioned between and extends parallel to two of the side members of the bracket, and has a bearing for one end of the shaft 17. The other end of the shaft 17 is journaled in the plate 6, the shaft passing through a hole 21 in the plate 5.

One extremity 18″ of the bracket 18 has an upwardly projecting portion which has a pivot hole or bearing 22 for a shaft 23. The other bearing of the shaft 23 is formed in a projection 24 on the opposite and parallel side of the bracket. The shaft 23 carries a gear wheel 25 and also a pinion 26 which latter meshes with a gear wheel 27 secured to the shaft 17.

A shaft 28 having a worm gear 29 meshing with the gear wheel 25 is journaled at one end in the side 18′ of the bracket 18 and at the other end in a bearing member 30 adjustably secured to the bracket. End thrust screws 31 having enlarged heads are positioned on the bracket 18 and the bearing member 30 in operative relation to pivots 32 at the end of the shaft 28. As will be seen by reference to Fig. 1 of the drawings, the heads of the screws 31 engage with the extremities of the adjacent pivots 32 and limit longitudinal movement of the shaft 28. The screws 31 are eccentrically mounted with respect to the bearings of the shaft 28, but so that the head of the screw is always in operative engagement with the coöperating pivot regardless of the position of the screw. Each screw thus limits the movement of the shaft in one direction, and by turning one or both of the screws the play of the shaft can be adjusted.

The arrangement and operation of the bearing member 30 will be best understood by reference to Fig. 2 of the drawings. One end of the member 30 extends into a slot 33 in the plate 5. The engagement of the bearing member with the ends of this slot in conjunction with a set-screw 36 firmly secures the member to the bracket. The bearing member has a substantially rectangular shaped hole 34 in which an eccentric cam 35 is positioned. The eccentric cam 35 is mounted to turn in a bearing in the other extremity 18''' of the bracket 18, as will be best seen by reference to Fig. 1 of the drawings. The cam surface of the eccentric cam 35 engages the sides of the hole 34, and thus the bearing member 30 can be moved with respect to the bracket 18 by turning the cam 35. The set-screw 36 extends through a slot 37 in the bearing member 30 and is adapted to secure the bearing member in its adjusted position to the extremity 18''' of the bracket.

The shaft 28 carries a gear wheel 39 which is directly in mesh with a worm gear 40 on the rotatable meter shaft 41. It will, therefore, be observed that by turning the eccentric cam 35 one end of the shaft 28 is moved whereby the operative engagement of the gearing between the meter shaft and the shaft 28 can be adjusted.

It will be observed from the foregoing description that the meter register and reduction gearing are secured together and operatively mounted in a single unitary structure adapted for direct connection to the meter shaft. The plates 5 and 6 are suitably spaced apart by spacing sleeves 42. Bolts 43 extend through the plates 5 and 6 and the sleeve 42 and serve to attach the meter register and coöperating reduction gearing to fixed posts 44 of the meter so that gear wheel 39 is in operative engagement with the worm gear 40 of the meter shaft. Since the meter register and coöperating reduction gearing are adapted for direct attachment as a unit to a fixed part of the meter the operative engagement between the worm gear of the meter shaft and the gear wheel 39 may be unsatisfactory due to slight imperfections in the construction of the parts or the assembling thereof. The adjustable bearing member 30 for one end of the shaft 28 overcomes this difficulty, since by movement of the member 30 the gear connection between the meter shaft and the shaft 28 can be satisfactorily adjusted.

Various applications of my invention to the rotatable shafts of electric motors of the electric meter type will be obvious to those skilled in the art. Numerous modifications in the details of construction and arrangement of parts of the meter register and attaching gearing herein described will further be apparent to those skilled in the art. It will of course be understood that I do not wish to limit myself to the specific construction so described and illustrated by way of example. I aim, accordingly, in the appended claims to cover all modifications and arrangements of parts within the spirit and scope of my invention.

What I claim as new and desire to secure by Letters Patent of the United States, is,—

1. In an electric motor of the electric meter type, a rotatable shaft, a second shaft operatively geared to said rotatable shaft, a fixed bracket, a bearing member having a bearing for one end of said second shaft and having a hole therein, means for securing said bearing member to said bracket, and means including an eccentric cam positioned in said hole and rotatably mounted on said bracket for adjusting the position of said member with respect to the bracket whereby the operative engagement of the gearing between said two shafts is adjusted.

2. In an electric motor of the electric meter type, a rotatable shaft having a worm gear, a main supporting plate, a bracket secured to said plate, a bearing adjustably secured to said bracket, a second shaft journaled at one end in said bracket and at the other end in said bearing, a gear wheel on said second shaft meshing with the worm gear on said rotatable shaft, said second shaft also having a worm gear, a third shaft journaled at both ends in said bracket and carrying a gear wheel meshing with the worm gear on said second shaft, a fourth shaft journaled at one end in said bracket, and intermeshing gears connecting said third and fourth shafts.

3. In an electric meter, a rotatable shaft, a second shaft operatively geared to said rotatable shaft, a fixed bracket, a bearing member having a bearing for one end of said second shaft and having a hole therein, an eccentric cam mounted on said bracket and positioned in the hole of said bearing member whereby the position of said member with respect to said bracket can be adjusted by turning said eccentric cam, a set-screw operatively engaging said bracket and adapted to secure the bearing member to the bracket in its adjusted position, a member to be driven by said rotatable shaft, and gearing operatively connecting said second shaft to said member.

4. In an electric motor meter, a rotatable meter shaft, a second shaft operatively geared to the meter shaft, a fixed bracket having a pivot hole in which one end of said shaft is journaled, a bearing member having a pivot hole in which the other end of said shaft is journaled, said bearing member also having a second hole therein, an eccentric cam mounted on said bracket and positioned in said second hole whereby the position of said member with respect to said bracket can be adjusted by turning said eccentric cam, a set-screw adapted to secure said member to said bracket in adjusted position, a meter register, and gearing operatively connecting said second shaft to the meter register.

5. In an electric motor meter, a rotatable meter shaft having a worm gear, a meter register comprising an integrating gear train and two parallel plates between which said gear train is suitably mounted, a bracket secured to one of said plates, a bearing adjustably secured to said bracket, a second shaft journaled at one end in the bracket and at the other end in said bearing, a gear wheel on said second shaft meshing with the worm gear on said meter shaft, said second shaft also having a worm gear, a third shaft journaled at both ends in said bracket and carrying a gear wheel meshing with the worm gear on said second shaft, a fourth shaft carrying the first gear of the integrating gear train and journaled at one end in said bracket and at the other end in one of said plates, and intermeshing gears connecting said third and fourth shafts.

In witness whereof, I have hereunto set my hand this eighteenth day of March, 1914.

ALEXANDER J. R. FIEGO.

Witnesses:
 JOHN A. MCMANUS, Jr.,
 FRANK G. HATTIE.